Sept. 11, 1934.    A. F. CLARKE    1,973,141
APPARATUS FOR TREATING LIQUIDS AND GASES
Original Filed June 25, 1929    2 Sheets-Sheet 1
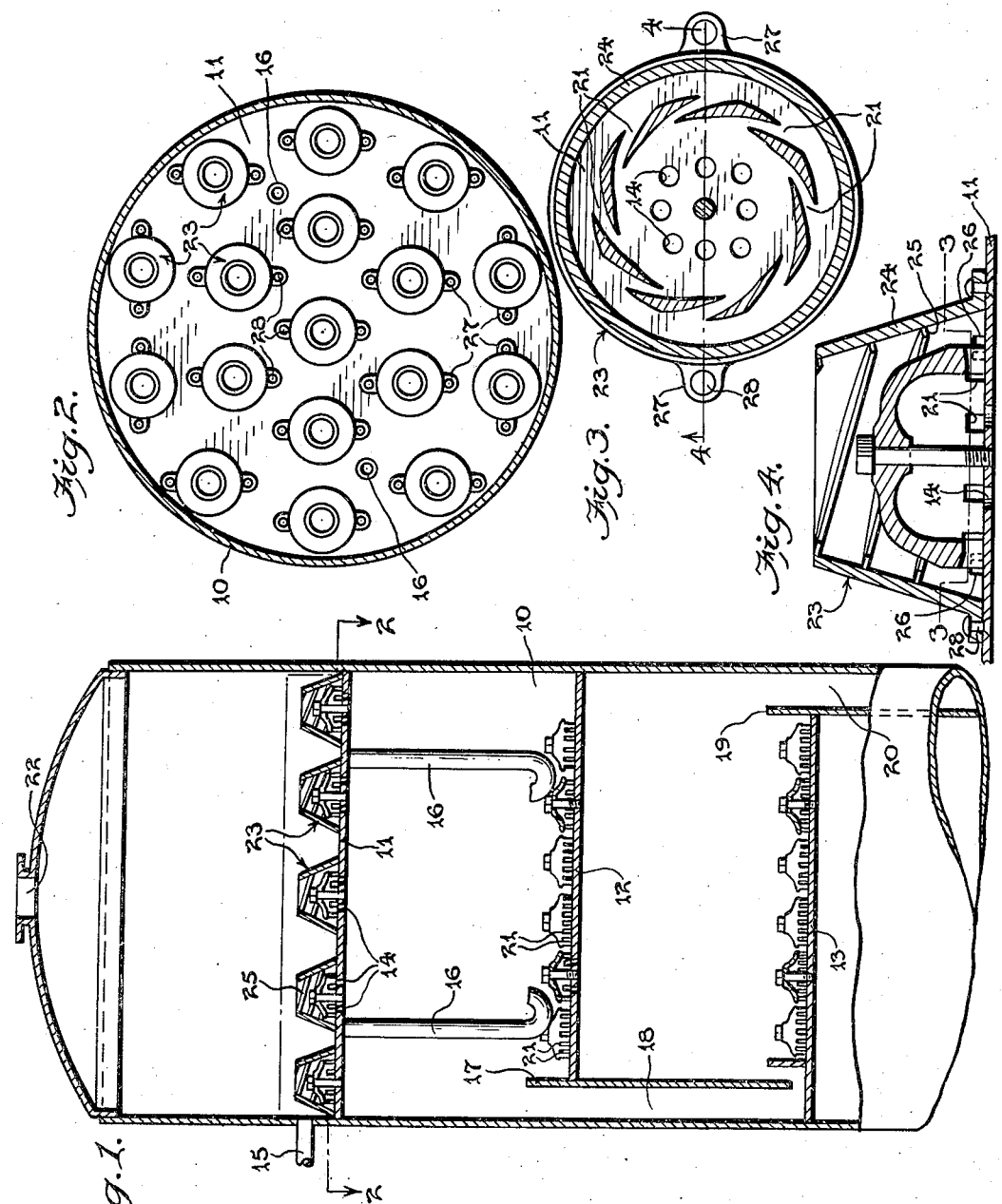
Inventor
A. F. Clarke, Dec'd
By Nell May Clarke
Execx.,
By Robt. E. Barry
Attorney Sept. 11, 1934.  A. F. CLARKE  1,973,141
APPARATUS FOR TREATING LIQUIDS AND GASES
Original Filed June 25, 1929  2 Sheets-Sheet 2
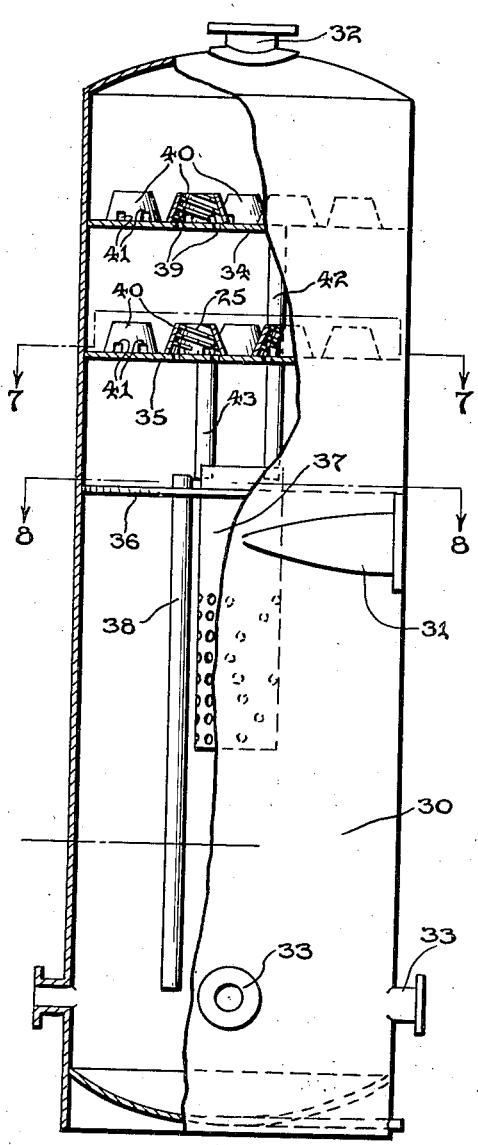
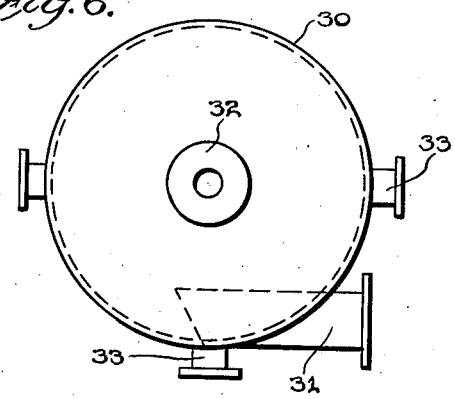
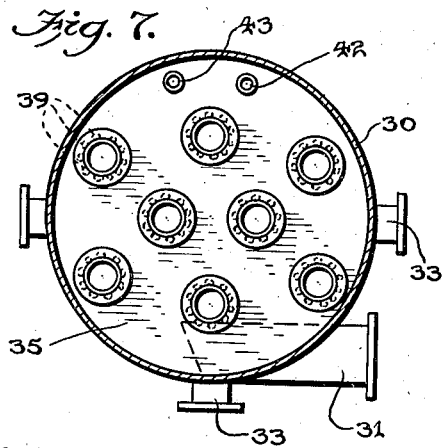
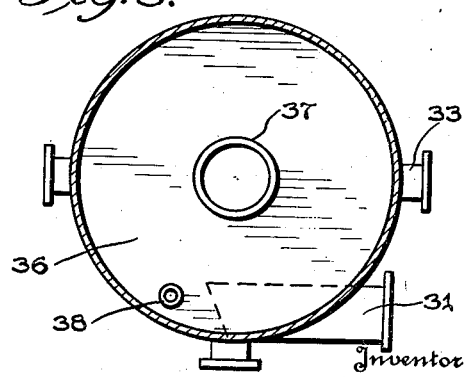
Inventor
A. F. Clarke, Dec'd
BY Nell May Clarke,
Execx.,
By Robt. E. Barry
Attorney Patented Sept. 11, 1934

1,973,141

UNITED STATES PATENT OFFICE

1,973,141

APPARATUS FOR TREATING LIQUIDS AND GASES

Arthur F. Clarke, deceased, late of Tulsa, Okla., by Nell May Clarke, executrix, Tulsa, Okla.

Refiled for abandoned application Serial No. 565,899, September 29, 1931, which in turn was a division of application Serial No. 373,636, June 25, 1929. This application February 2, 1934, Serial No. 709,529

7 Claims. (Cl. 261—114)

This invention relates to improvements in apparatus of the type used for contacting liquids and gases or for separating mixtures of liquids and gases.

This case is a refile for abandoned application No. 565,899 filed Sept. 29, 1931, which abandoned application was in turn a division of an application No. 373,636 filed June 25, 1929, and since matured into Patent No. 1,846,248.

These improvements may be employed with absorption towers, rectifying columns, oil and gas separators, or the like. In such apparatus, the gas in the tower rises and the liquid descends, and one of the objects of the invention is to combine with such a tower or column, a mist extractor for positively separating entrained liquid from the gas, just before the gas is discharged from the top of the tower. The improved mist extractor which is claimed and described in United States Patent No. 1,846,248, Feb. 23, 1932, removes from the gas or vapor whatever liquid may be carried into the mist extractor zone by the gas.

Another object is to combine such a mist extractor with a bubble cap, nozzle, nipple or other suitable appliance or port in a deck arranged in the column, such extractor having a spiral baffle on which the entrained liquid collects as the gas whirls through the mist extractor.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a vertical sectional view of the upper portion of a rectifying column or absorption tower, and showing the improved mist extractors applied over bubble caps on the top deck of the column.

Fig. 2 is a horizontal sectional view on the line 2—2 of Fig. 1.

Fig. 3 is an enlarged sectional view of one of the mist extractors and bubble caps.

Fig. 4 is a vertical sectional view of the same on the line 4—4 of Fig. 3, and showing a bubble cap in full lines, arranged therein.

Fig. 5 is a side elevation partly in vertical section of an oil and gas separator provided with the improved mist extractors.

Fig. 6 is a top plan view of the same.

Fig. 7 is a horizontal sectional view on the line 7—7 of Fig. 5.

Fig. 8 is a sectional view on the line 8—8 of Fig. 5.

In the embodiment of the invention illustrated in Figs. 1 to 4 inclusive, 10 indicates the shell of an absorption tower or rectifying column, which is provided with superposed decks 11, 12, 13 having suitable apertures 14 through which gas introduced into the column rises. The liquid introduced into the column through a pipe 15, flows over the upper deck, and then descends through trap pipes 16 to the second deck 12. The liquid flows over this deck and is discharged over a weir 17, into a passageway 18, which conveys the liquid to the third deck 13. Liquid flowing over this deck will pass over a weir 19, into a passageway 20, which conducts it to the next lower deck and so on. The bubble caps which it is preferred to employ, are of the type shown in U. S. Patent #1,878,467, dated Sept. 20, 1932, and the gas after passing through tangential slits 21, in these caps, whirls through the liquid on the decks, and is finally discharged through the gas or vapor outlet 22 at the top of the column.

In absorption towers, rectifying columns or the like, the rising gas or vapor may carry some entrained liquid, and as it is desirable to separate such liquid from the gases or vapors leaving the column, each bubble cap on the top deck is provided with a mist extractor 23. Such extractor is best shown in Figs. 3 and 4, and preferably consists of a frusto-conical tube 24 having a spiral thread or baffle 25 arranged on its inner surface. As the gas or vapors are discharged by the bubble cap into the tube 24, the spiral baffle acts to whirl the gas and cause the deposit of entrained liquid on the inner surface of the tube and on the baffle, due to centrifugal action. The liquid thus collected, gravitates down the interior of the tube and is finally deposited in the liquid pool on the deck. To permit this, the tube is provided with notches 26 at its lower edge, to allow free passage of liquid along the deck, to and from the interior of the tube. Each tube is preferably provided with a pair of apertured ears 27, to receive any suitable fastening devices, such as rivets 28, to secure the mist extractor that may be employed to secure the mist extractor to the deck. It may be seen from Figs. 3 and 4 that the tangential ports 21 of the bubble caps on the top deck function to whirl the rising gas through the liquid on that deck, and as the spiral baffles 25 are arranged to coincide with the direction of movement of the gas, this whirling action of the gas will be continued until the gas is discharged from the upper end of the extractors.

Figs. 5 to 8 inclusive, show an improved type of oil and gas sparator, provided with these mist extractors. In this embodiment of the invention, the shell of the separator is designated 30. The mixture of oil and gas is introduced tangentially into the cylindrical shell by means of the pipe 31, and the gas is discharged at 32, and the liquid exits through the pipes 33. Arranged within the shell are horizontal decks 34, 35 and 36 which are secured in position by any suitable means. A perforated pipe 37 extends downwardly through the lower deck, and it functions to convey gas and entrained liquids from the zone below the lower deck to the zone above the lower deck. Any condensate or liquid deposited on the lower deck will overflow downwardly through the pipe 38 into the lower end of the shell. This pipe is suspended from the deck 36 by any suitable means. At this point it will be noted that the deck 36 is imperforate with the exception of the two apertures with which it is provided to accommodate the pipes 37 and 38. The decks 34 and 35 are substantially alike, and each has a number of circularly arranged series of apertures 39 to accommodate the rising gas and vapors so that such gas and vapors may move from one zone to the next higher zone, and so on; and each series of these apertures is combined with one of the improved mist extractors 40 of the type shown in Figs. 3 and 4, so that the gas and vapor rising through the decks will be whirled by the spirals of the mist extractors to cause precipitation of the entrained liquids which will be discharged through the notches 41 on to the deck. Liquid deposited on the upper deck, flows downwardly through a pipe 42 on to the lower deck, and liquid deposited on the intermediate deck, flows downwardly on to the lower deck through a pipe 43.

In the operation of this embodiment of the invention, the mixture of oil and gas enters the shell through the inlet 31, and due to the tangential arrangement of this inlet, and the circular internal surface of the shell, the mixture will be whirled so that the major portion of the liquid will be deposited on the inner surface of the shell, due to centrifugal force. Of course, this liquid will gravitate to the bottom portion of the shell. After this initial or rough separation, the gas with entrained liquid rises through the perforated pipe 37, and owing to the perforations being small, an additional amount of the liquid will be separated from the gas, and this liquid will also flow down into the lower end of the shell. The gas and entrained liquid discharging from the upper end of the pipe 37, now rise through the series of ports 39 in the deck 35, and are whirled by the baffles in the mist extractors 40, so that there is a further separation of oil from the gas. The oil thus separated, flows through the notches 41, on to the deck 35, and finally overflows through the pipe 43. The gas, from which practically all of the liquid has now been separated, then rises through the apertures 39 of the top deck, where the separating action is continued, and the liquid deposited on this deck overflows through the pipe 42. The gas finally freed of entrained liquid, is discharged through the pipe 32.

In the foregoing description, preferred embodiments of the invention have been set forth, but it is manifest that changes may be made in the details disclosed, without departing from the spirit of the invention, as expressed in the claims.

What is claimed and desired to be secured by Letters Patent is:

1. In an apparatus of the character described, a deck over which liquid may flow, ports in the deck to permit gas to rise through the same, and mist extractors positioned on top of the deck to receive gas rising through the ports, each mist extractor comprising an annular wall and being provided internally with means for whirling the rising gas for centrifugally precipitating entrained liquids within the extractor, each extractor having means to permit the liquid to flow through the lower end of the wall thereof.

2. In an apparatus of the character described, a deck over which liquid may flow, ports in the deck to permit a gaseous mixture to rise therethrough, bubble caps arranged on the deck and cooperating with said ports, and mist extractors surrounding the bubble caps and provided with means for centrifugally separating entrained liquid from the gaseous mixture after it has passed through the ports and bubble caps.

3. In an apparatus of the character described, a deck over which liquid may flow, means to permit a gaseous mixture to flow through the deck, a bubble cap arranged on the deck and cooperating with the last mentioned means, and a mist extractor arranged on the deck and surrounding the bubble cap and provided with means for centrifugally separating entrained liquid from the gaseous mixture.

4. In an apparatus of the character described, a deck over which liquid may flow, said deck being provided with means to permit a gaseous mixture to flow therethrough, a bubble cap mounted on the deck and adapted to whirl the gaseous mixture, after the latter has passed through the deck, and a tubular mist extractor surrounding the bubble cap, and provided with means for centrifugally separating entrained liquid from the rising gaseous mixture.

5. In an apparatus of the character described, a deck over which liquid may flow, a port in the deck to permit a gaseous mixture to flow through the deck, a bubble cap mounted on the deck and cooperating with said port, and a mist extractor mounted on the deck and surrounding the bubble cap, said mist extractor comprising a tubular member of frusto-conical shape provided with an internal spiral baffle, and having an opening at its lower end to allow liquid to flow through the wall of the tubular member.

6. An oil and gas separator including a shell, apertured decks arranged in spaced relation within the shell, and mist extractors mounted on the decks and cooperating with the apertures of the deck to permit a gaseous mixture to rise within the shell, each mist extractor comprising an annular wall and being provided with an internal spiral baffle, the wall having an aperture to permit liquid to flow through said wall.

7. In an oil and gas separator, a shell, spaced horizontal decks arranged in the shell and provided with ports to permit a gaseous mixture to rise through the decks, and mist extractors mounted on the decks and cooperating with said ports, each mist extractor being of frusto-conical tubular form and provided internally with a spiral baffle and having apertures at its lower end to permit liquid to flow through the same.

NELL MAY CLARKE,
Executrix of the Estate of Arthur F. Clarke, Deceased.